Figure 1:
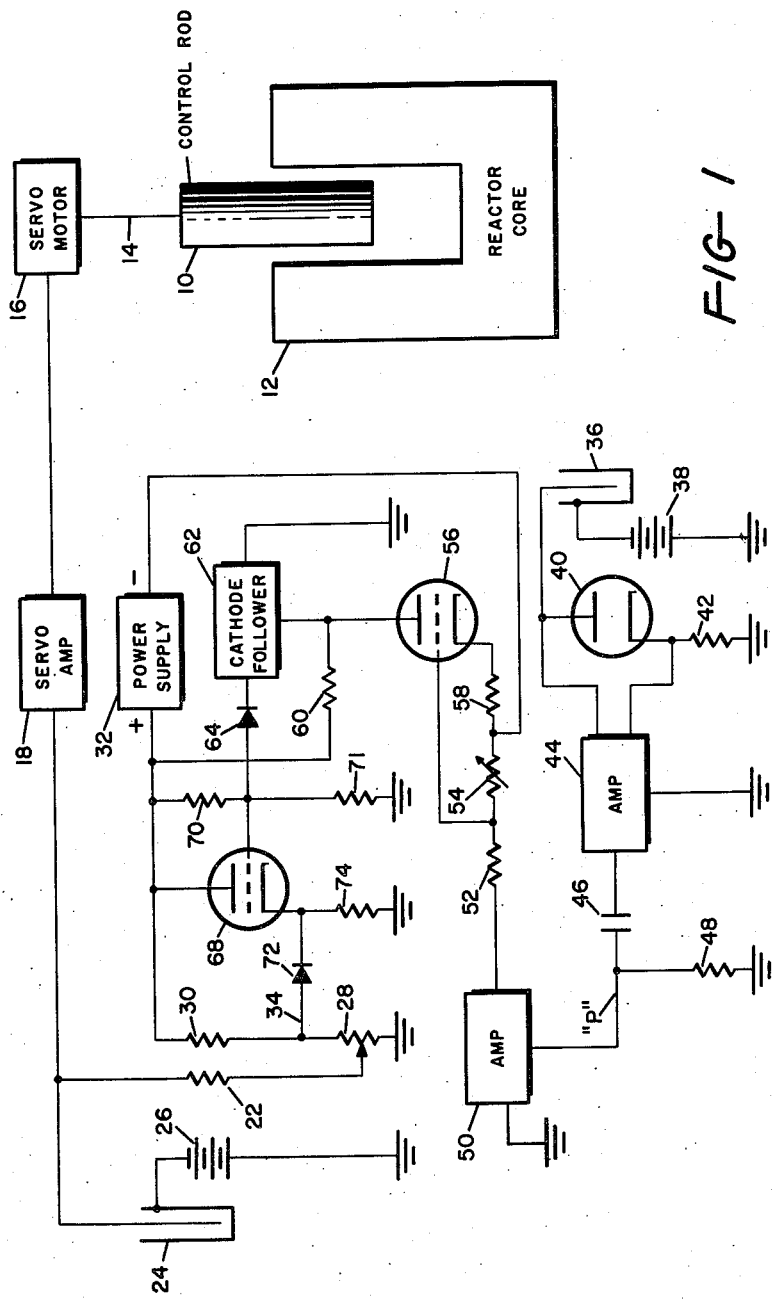

United States Patent Office 3,038,847
Patented June 12, 1962

3,038,847
REACTOR CONTROL
William J. Hartin, Royal Oak, Mich., assignor to The Bendix Corporation, a corporation of Delaware
Filed Jan. 22, 1957, Ser. No. 635,365
2 Claims. (Cl. 204—193.2)

This invention relates to control systems for nuclear reactors.

In certain types of nuclear fission reactors, control over the power output of the reactor is achieved through varying the position of rods containing fuel elements or neutron absorbing elements with relation to the main reacting mass or core. For a given rod position the number of neutrons which are produced in a particular time is equal to the number of neutrons which were present at the beginning of that time multiplied by "coefficient of growth" which may be greater or less than one. If rods containing fuel elements are used for control purposes an increase in proximity of the rods with respect to the core will increase the coefficient and thereby increase neutron generation while a removal of the rods will decrease the coefficient. If moderator or neutron absorbing elements are used in the control rods the reverse relationship holds and an increase in the proximity between the rods and the core will decrease the coefficient of multiplication while a removal of the rods from the core will increase the coefficient.

In general, for any given reactor there is one control rod position which causes the coefficient to be one, whereby the neutron generation remains at a fixed level, neither increasing or decreasing. Because of gradual changes in the composition of the core this zero position may shift over a period of time. It is, therefore, necessary to provide reactor controls which will seek this zeroing position automatically. It is also desirable to provide a control which will automatically bring the reactor from zero power output level up to a particular demand power level and also shift the reactor output from one particular demand level to another.

These controls are commonly achieved by measuring the power output at a particular time and comparing a signal which is proportional to this output to a predetermined signal which is proportional to the desired power output level. The difference between these two signals is applied to a servomechanism control which then automatically positions the rods. When the power output signal is different from the demand signal the rods are moved in such a direction as to bring the difference to zero.

However, this control action must be subject to the condition that the rate of increase of neutron generation can never exceed particular values which indicate that the reactor is in a condition in which it is impossible to decrease the rate of neutron generation because of the self-sustaining nature of the reaction.

The accepted method of guaranteeing that the rate of neutron generation does not exceed this limiting rate is to provide automatic shut-off controls which immediately move the rods in such a direction as to shut the reactor down as this dangerous rate is approached. Although this method is acceptable for research purposes it provides a possibility of discontinuity of power generation which is unacceptable for commercial operations.

It has also been proposed that a signal which is proportional to the rate of increase of neutron generation be superimposed upon the control signal which represents the difference between the power output level and the power demand level in such a manner as to prevent the control signal from being of such a magnitude and direction as to increase the neutron multiplication rate above a certain preselected value. This last method suffers from the disadvantage of continually maintaining the rate of power increase below a particular level which is dependent on the value of the change that is desired. Thus, if a small change in power levels is required the rate signal may so override the demand level signal as to make the desired change require a very long period of time.

The present invention contemplates a modification of that control scheme in which a signal proportional to the rate of change of neutron generation of the reactor is subtracted from the demand level signal in proportion to the actual level of the demand signal. That is, for a larger demand signal a higher percentage of the rate of power generation signal is subtracted. Therefore, a control is achieved which is proportional to the power level at which the reactor is operating and changes at small power levels may be performed rapidly without fear of entering a dangerous range. In order to further achieve this objective, below certain small reactor rate levels no signal voltage is subtracted from the demand level signal. Therefore, at any power level changes in power level may be made at the maximum possible rate.

It is an object of the present invention to provide a control system for nuclear fission reactors which will automatically operate to bring the reactor to desired power levels in the minimum possible time which is consistent with maintaining the reactor in a safe condition.

A further object is to provide a control system which utilizes a control based upon the rate of increase of neutron generation in the reactor.

Another purpose is to provide control systems for reactors which allows changes within safe ranges to be made in the minimum possible time.

Other objects, applications and advantages of the present invention will be made clear by the following detailed description of an embodiment of the invention.

The description makes reference to the accompanying drawing which represents a partially blocked schematic view of circuitry for the practice of the present invention.

In the particular embodiment described control is achieved through the movement of a control rod 10 containing a radioactive fuel element. Therefore, a downward movement of the rod 10 into the reactor core 12 increases the rate of neutron generation while an upper movement of the rod 10 out of the reactor core 12 decreases the rate of neutron generation. The rod 10 is carried by a cable 14 which is moved by a servomotor 16. This motor may be either mechanical or hydraulic in operation and it performs the function of moving the cable 14 at a rate and in a direction which is proportional to the magnitude and polarity of its input signal.

This signal is provided by an amplifier 18 which receives its input from an ionization chamber 24 which is primarily sensitive to neutron radiation and from a resistor 22. The chamber 24 is placed in proximity to the reactor core 12 so as to receive a number of neutrons which is directly proportional to the power output of the reactor. Its shell is maintained at a negative potential by a battery 26. The amplifier 18 receives a signal which is proportional to three factors: the rate of increase of the neutron radiation from the reactor, the instantaneous power level output, and the power output level that is desired. The output level that is desired is manually set on a potentiometer 28 which has a variable contact connected to the resistance 22. The potentiometer 28 receives power through a resistor 30 which is connected to the output of a regulated power supply 32, therefore, in the absence of any signal on line 34 the voltage across at the variable contact is strictly a function of the setting of the potentiometer 28 and the output of the power supply 32.

This demand signal across the potentiometer 28 must, however, be modified by a signal which is proportional to the rate of neutron generation in the reactor. This modifying signal is originally developed by a second ionization chamber 36 which has its shell charged to a positive potential by a battery 38. The ionization chamber 36 is also disposed in proximity to the reactor core 12. The output of the chamber 36 connects to the plate of a diode tube 40 which has its cathode grounded through a resistance 42. An amplifier 44 is connected across the diode 40 so as to receive a signal which is proportional to the voltage across the diode and, therefore, to the logarithm of the current through the diode. Since the current through the diode is determined by the output of the ionization chamber 36, the amplifier 44 receives a signal which is proportional to the logarithm of the output of the chamber 36.

The amplifier feeds a differentiating circuit comprising a capacitor 46 and a grounded resistor 48. The output of the differentiating circuit then constitutes the differential of the logarithm of the neutron output of the reactor. This quantity is commonly used as an indication of the rate of growth of neutrons in the reactor and will be termed P.

This signal is fed to the amplifier 50 and then to one end of a resistance network which includes the resistor 52 and the variable resistor 54. The variable resistor 54 is connected to a source of negative potential at its other end so that the midpoint of the network is maintained at a potential which is equal to some fraction of the difference in potential between the negative potential source and the signal P.

This voltage is fed to the grid of a triode tube 56 which has its cathode maintained at a negative potential through a resistance 58 and its plate connected to a source of positive potential through a resistance 60. The potential of the plate of the tube 56 is, therefore, proportional to the inverse of the source of negative potential minus P, or $K(X-P)$ where K and X are constants. This output is fed through a cathode follower circuit 62 to the cathode of a semiconductor diode 64. The anode of the diode 64 is connected to the grid of a vacuum tube 68 and to the midpoint of a resistance network 70 and 71 which has one end grounded and the other end connected to a positive terminal of power supply 32.

As long as the output of the cathode follower circuit 62 presents a higher potential than does the midpoint of the resistance network 71 and 70 the diode 64 will not conduct. However, when the voltage output of the cathode follower 62 goes below the voltage of the midpoint of the resistances 71 and 70 the diode 64 begins to conduct and thus lowers the voltage to the grid of the tube 68.

The variable resistance 54 is initially so adjusted that the output of the cathode follower 62 will be greater than the voltage at the midpoint of the resistance network 71 and 70 for all values of P which are high enough so that the command signal on the potentiometer 28 need not be modified by a period signal in order to assure safe operation of the control system. When the period goes below the value initially selected by the variable resistance 54, the diode 64 conducts, lowers the potential of the grid of the triode 68 and, therefore, lowers the potential of the cathode of the tube 68 which is connected to the cathode of a second diode 72 and to ground through a resistor 74. The diode 72 has a very low breakdown voltage so that the line 34 follows the variations of the cathode of the triode 68 with the exception of a small range of positive values of the cathode.

The potential of the line 34 is of such a sign as to reduce the potential across the demand potentiometer 28 when the diode 64 is conducting.

At such times the voltage across the tapped portion of the potentiometer 28 is proportional to $$\frac{D}{M}E[K(X-P)]$$

or $$\frac{D}{M}E[K(1-P)]$$

since both K and X are constants: Where $D=$ the demand setting of the potentiometer 28
$M=$ the full scale setting of the potentiometer 28
$E=$ the total voltage across the potentiometer 28

When the diode 64 is nonconducting the voltage across the tapped portion of the potentiometer 28 becomes simply $$\frac{D}{M}E$$

It is, therefore, seen that when the period of the reactor goes below a certain value the voltage across the demand potentiometer 28 will be lowered so that the servo signal which controls the motion of a fuel rod 10 will be lowered. Because this lowering period voltage is impressed across the entire length of the potentiometer 28, it is only subtracted from the demand signal in proportion to the full value of the demand signal. Therefore, at low demand signals lowered values of periods are allowable. This allows small changes in the demand level to be achieved in minimum time commensurate with maintaining a safe period level.

Having thus described my invention, I claim:

1. In a nuclear fission reactor having positioning rods for varying the coefficient of multiplication of the neutron output of the reactor, means for controlling the position of said rods comprising: a servomechanism operatively connected to and adapted to vary the position of said rods with respect to said reactor in accordance with a control signal applied to it; means for producing a first electrical signal which is proportional to the power output of said reactor; means for producing a second electrical signal which is proportional to the power output which it is desired to obtain from said reactor; means for producing a third electrical signal which is proportional to the rate of increase of neutrons within the reactor; means for reducing said second signal in proportion to the magnitude of the second signal and also in proportion to the magnitude of the third signal; and means operatively connected to said servomechanism for algebraically combining said first and modified second signals so as to control said servomechanism.

2. In a nuclear fission reactor having positioning rods for varying the coefficient of multiplication of the neutron output of said reactor, means for controlling the position of said rods comprising: a servomechanism operatively connected to and adapted to vary the position of said rods with respect to said reactor in accordance with a control signal applied to it; means for developing a first electrical signal which is proportional to the instantaneous neutron output of said reactor; means for developing a second electrical signal which is proportional to the neutron output desired from said reactor; means for developing a third electrical signal which is proportional to the rate of increase of the neutron generation of said reactor; means operative, during such times that the rate of increase of neutron generation exceeds a particular value, to reduce said second signal in proportion to the magnitude of the second signal and also in proportion to the magnitude of the third signal; and means operatively connected to said servomechanism for controlling said servomechanism in accordance with the signal which is proportional to the difference between said first electrical signal and said modified second electrical signal.

References Cited in the file of this patent

Proceedings of the International Conference on the Peaceful Uses of Atomic Energy, United Nations, New York, vol. 3 (1955), pp. 188–190 (article by Weill).

Schultz: Control of Nuclear Reactors and Power Plants, McGraw-Hill Book Co., Inc. (1955), pp. 62–65.

Journal of Nuclear Energy, vol. 1 (1954), pp. 24–38 (article by Bonnaure et al.).

M–4415, Manual of Instruments and Controls for the Brookhaven Nuclear Reactor, U.S. A.E.C. document dated May 1949, declassified January 13, 1956; pp. 65, 67–74, 77, 78.

TID–7001, Materials Testing Reactor Project Handbook, U.S. A.E.C. document dated May 7, 1951, declassified August 24, 1955; pp. 250–255, 260–262, 274.

Cox, IRE Trans. on Nuclear Science, vol. NS–3, No. 1, (February 1956), pp. 15–20.

Barton et al.: Am. J. of Physics, vol. 20, No. 9, (December 1952), pp. 557 and 558.

Moore: Proc. Inst. Elect. Engrs. (London), vol. 100, No. 123, part 1, 1953, pp. 96 to 101.

Cox: Nuclear Power, vol. 1, August 1956, pp. 161 through 164.